April 24, 1951  N. F. ANDREWS  2,549,999
CORN HARVESTER HAVING DETACHABLE HUSKING MEANS
Original Filed Nov. 20, 1944  4 Sheets-Sheet 4

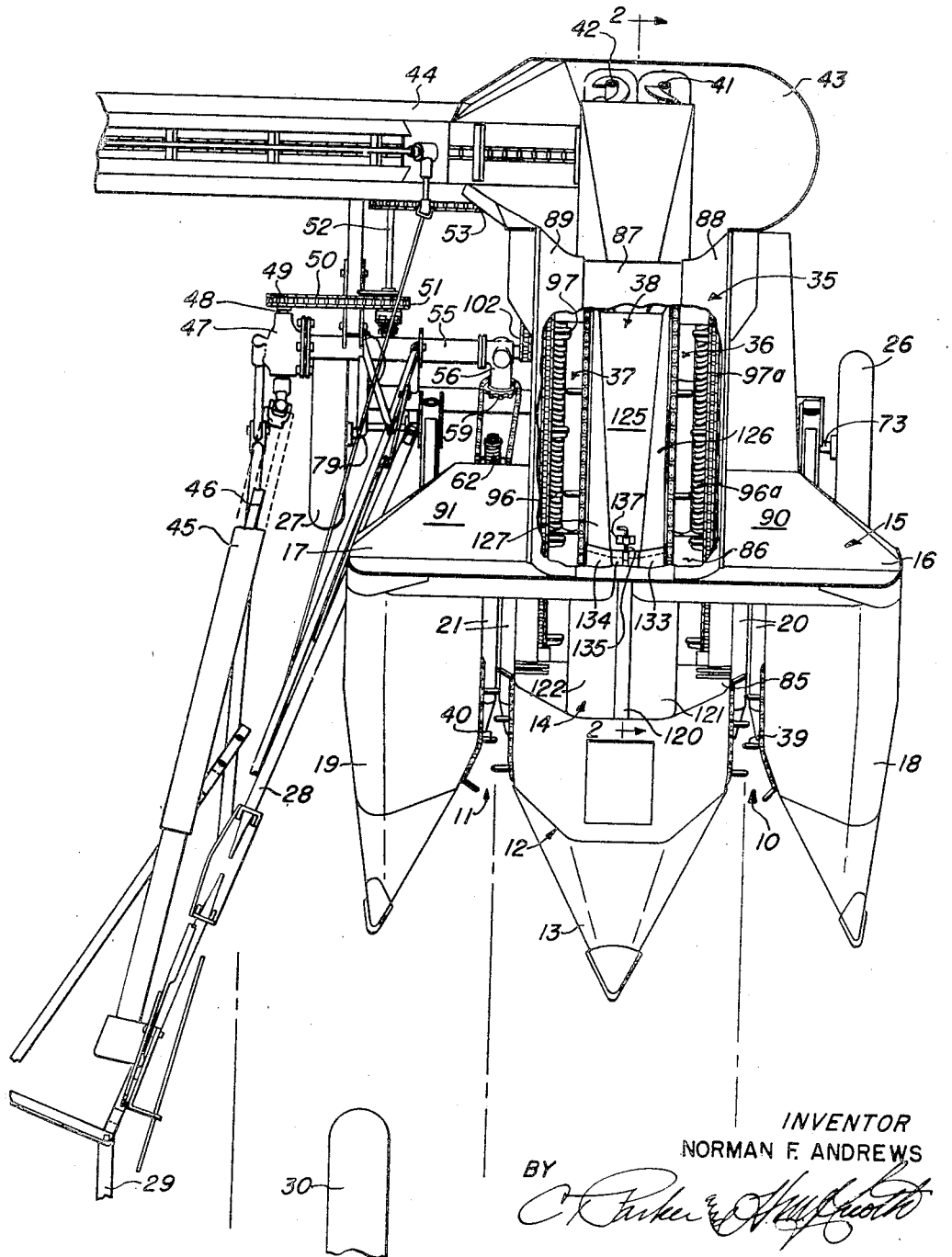

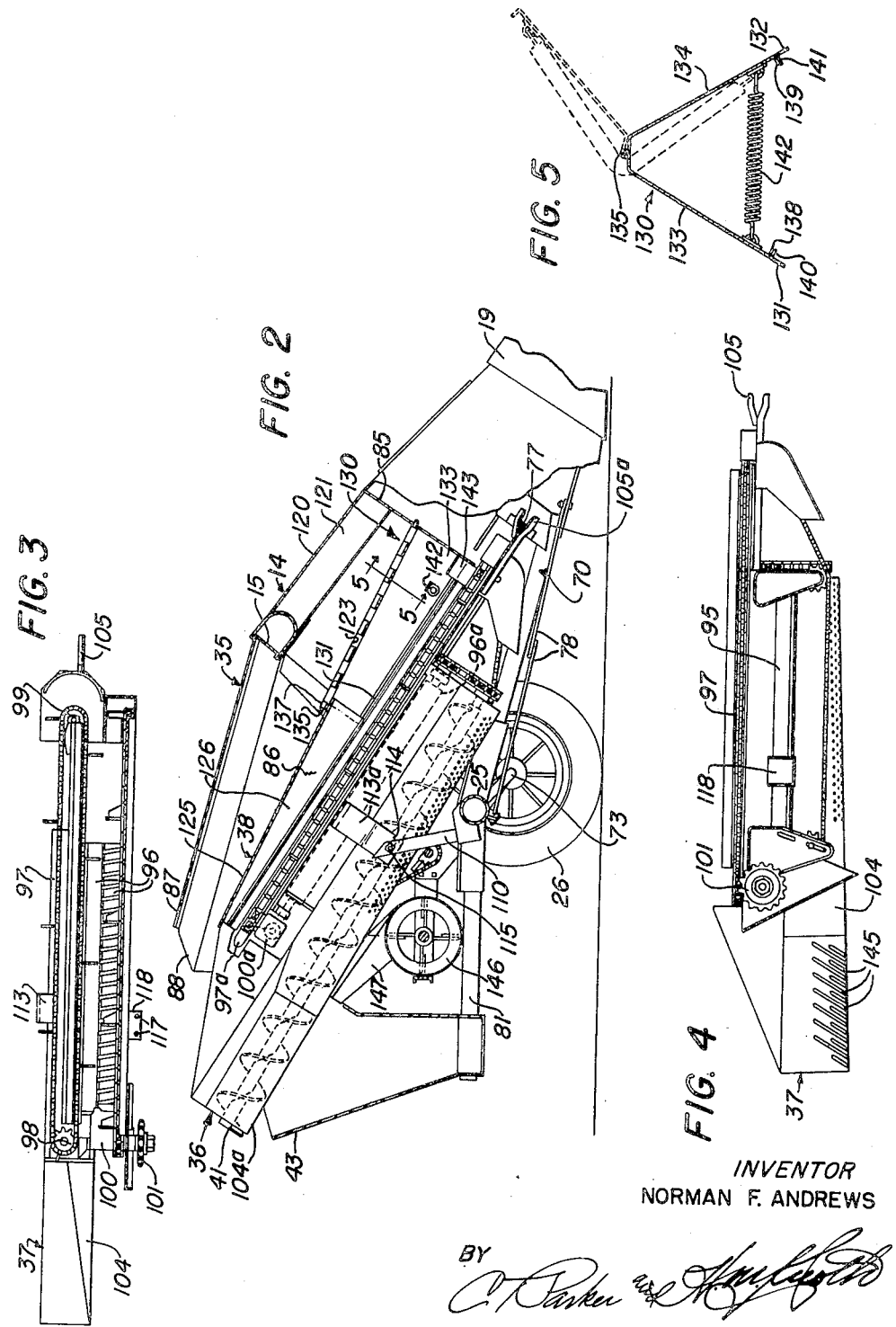

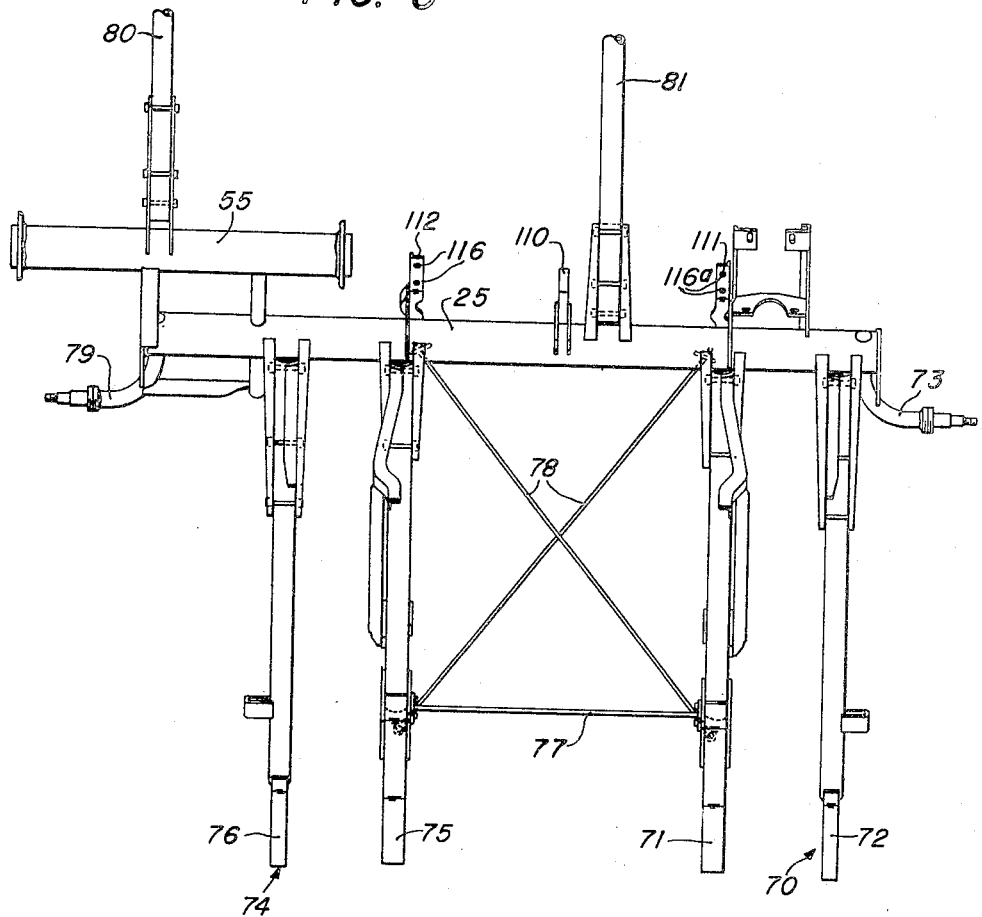

FIG. 7

INVENTOR
NORMAN F. ANDREWS
BY
ATTORNEYS

Patented Apr. 24, 1951

2,549,999

UNITED STATES PATENT OFFICE 2,549,999

CORN HARVESTER HAVING DETACHABLE HUSKING MEANS

Norman F. Andrews, Moline, Ill., assignor to Deere & Company, Moline, Ill., a corporation of Illinois Original application November 20, 1944, Serial No. 564,292. Divided and this application December 29, 1947, Serial No. 794,375

7 Claims. (Cl. 56—106)

The invention disclosed and claimed herein is divided out of a co-pending application, Serial No. 564,292, filed November 20, 1944, now United States Patent 2,494,080, issued January 10, 1950, in which I am named as one of the joint inventors.

This invention relates to an agricultural machine of the crop harvester type; and more particularly to structure for supporting a removable crop handling mechanism such as a husking unit.

The invention contemplates and has for its principal object the provision of improved structure in connection with a corn harvester of the two-row type, and specifically aims to provide in such structure a removable husking unit carried centrally between a pair of transversely spaced gathering units; in this respect it is a feature of the invention to provide supporting structure including quickly removable or detachable connections by means of which the husking unit may be readily removed from or installed in place between the gathering units. The structure based on the invention in this respect distinguishes from known structures which are characterized in that the gathering units and husking units are preassembled with no thought given to the desirability of unit disassembly of the mechanism. In the present case, although the husking units are rigidly secured in place, the connections are such that quick release thereof may be obtained so that the units may be easily removed, certain of the connections involving sliding engagement and disengagement of parts. A related object pertains to the use of structural parts of the harvester frame as means for mounting the removable husking units. In another aspect, the invention relates to improved frame structure in which certain structural components are utilized for the purposes of supporting, bracing or carrying a plurality of harvester units.

Another object of the invention relates to the provision of harvester structure including a housing having a pair of openings therein, the openings being provided with covering panels that may be moved individually to uncovering position for the purpose of providing access to the mechanism enclosed within the housing structure. A specific object of the invention in this respect relates to a single spring for holding both of the panels or doors in the housing closed, the spring being so associated with the panels that either panel may be opened and will remain open while the other panel remains in closed or covering position.

Other objects and important features inherent in and encompassed by the invention will become apparent to those skilled in the art as a preferred embodiment of the invention is described in detail in the following description and is illustrated in the accompanying sheets of drawings in which Figure 1 is a general plan view of a two-row corn picker embodying the principles of the invention, portions of the structure illustrated being broken away to expose interior parts;

Figure 2 is a longitudinal fragmentary section taken substantially on the line 2—2 of Figure 1, the section line lying along the inside or right hand side of the left hand husking unit;

Figure 3 is a plan view of the right hand husking unit per se;

Figure 4 is a side view of the structure shown in Figure 3, the view being taken from the outside or right hand side of the right hand husking unit;

Figure 5 is an enlarged fragmentary transverse sectional view taken substantially on the line 5—5 of Figure 2, showing the housing structure and movable panels for providing access to the interior of the housing;

Figure 6 is a skeleton view of the frame structure which is used to support the gathering and husking units and which forms the main part of the harvester frame; and Figure 7 is a perspective rear view of the picker with the husking mechanism removed.

The machine chosen for the purposes of illustration and description is a corn picker of the two-row type. This structure has been selected for the present disclosure because it embodies the invention in its most desirable aspect. However, it is not desired that the detailed structure illustrated and described be construed in any way as limiting the invention or the spirit and scope thereof as defined in the appended claims.

Reference will be had to Figure 1 for a brief and general description of the corn picker and its operative components. In this figure the numeral 10 designates a left hand gathering unit and the numeral 11 designates a right hand gathering unit. A central housing structure 12 having a forwardly extending central divider 13 is positioned between the gathering units 10 and 11. The housing structure 12 continues rearwardly at 14 and is associated with a transverse wall 15 which extends laterally outwardly to include portions 16 and 17 located respectively behind the left hand and right hand gathering units 10 and 11. A left hand gathering shield or divider 18 extends forwardly from the wall portion 16 alongside the left hand gathering unit 10. A similar shield or divider 19 is associated with the wall 17 and the right hand gathering unit 11. The gathering unit 10 includes a pair of snapping rolls 20 positioned longitudinally in a longitudinal space between the central divider 13 and left hand divider or shield 18. A pair of snapping rolls 21 is similarly associated at the right hand side of the machine between the central divider 13 and the right hand shield or divider 19.

The entire harvester or picker is carried on a frame structure including a transverse support or axle designated generally by the numeral 25 (Figures 2 and 6). This axle or support is carried at its opposite ends on a pair of wheels, the numeral 26 designating the left hand wheel and the numeral 27 designating the right hand wheel. The frame includes a forwardly extending draft structure, designated generally by the numeral 28, which is connected at its forward end to drawbar structure 29 on a tractor, only the left hand rear wheel of which is shown and identified by the numeral 30, it being understood that the harvester is towed behind the tractor in the conventional manner, that is, offset to one side of the tractor and rearwardly thereof. Further illustration and description in this respect are deemed unnecessary, since the relationship of the tractor and picker in general is well known to those skilled in the art.

The housing or shielding structure 12, 14, 15, includes, as a rearward extension thereof, a generally longitudinally extending housing or enclosure structure 35 within which is carried husking mechanism, here shown as comprising a left hand husking unit 36 and a right hand husking unit 37, the details of which will be set forth hereinafter. These husking units are separated by a longitudinally extending interior housing structure 38, the functions and detailed structure of which will presently appear. The arrangement is such that the function of the picker in many respects follows that of conventional pickers; that is, the gathering units, by means of the snapping rolls 20 and 21 and sets of left hand and right hand gathering chains 39 and 40, respectively, gather corn and deliver it rearwardly and laterally to the husking mechanism 36 and 37, whence it is delivered rearwardly by means of a left hand auger conveyor 41 and right hand auger conveyor 42 to a hopper 43 which ultimately delivers the corn laterally to the right by means of a transversely extending and upwardly inclining wagon elevator 44. The specific type of gathering units and the particular kind of wagon elevator, form no part of the present invention and the details thereof are adequately disclosed in the co-pending application referred to above. Reference is made to these parts generally here for the purpose of providing a background for the better understanding of the invention as related to the husking mechanism and supporting structure therefor.

The operating parts of the picker may be suitably driven by power derived from the tractor. Only so much of the drive mechanism as is deemed necessary to a general understanding of the operation of the picker has been illustrated and will be described. The draft structure 28 may be of the type including a longitudinally extending tubular structure 45 which houses a longitudinally extending shaft 46, the rear end of which is drivingly associated with mechanism in a gear box 47 for driving a rearwardly extending stub shaft 48 on which is carried a driving sprocket 49. A chain 50 trained about the sprocket 49 and a second sprocket 51 on a longitudinal shaft 52 provides means for driving a chain 53 which may be connected in any suitable manner (not shown) to drive the conveyor of the wagon elevator 44.

As best shown in Figures 1 and 7, the gear housing 47 has associated therewith a laterally extending tube 55 which is flanged at its inner end and connected to a gear housing 56. The train of power proceeds through a laterally extending shaft 57 which is parallel to and rearwardly of the transverse axle or support 25. The left hand end of the shaft 57 enters a left hand gear box 58 carried at the left hand side of the axle 25. A forward extension 59 on the right hand gear box 56 houses a shaft (not shown) to the forward end of which is keyed a drive sprocket 60. A driving chain 61 is trained about the sprocket 60 and is provided for the purpose of driving the snapping rolls 21 and set of gathering chains 40 of the right hand gatherer unit 11, the driving mechanism for the latter parts being indicated collectively by the numeral 62 in Figure 7, it being understood that the driving connections may be made in any conventional manner.

The driving mechanism in the left hand gear box further supplies power to a driving sprocket 65 which by means of a driving chain 66 furnishes power to drive the snapping and gathering mechanisms of the left hand gatherer unit 10, the drive gearing and sprockets for this unit being indicated collectively by the numeral 67 in Figure 7.

Figure 6 shows the frame structure, with all super-structure removed. From this figure it will be seen that the transverse axle 25 may be considered the main structural component of the frame. A frame component or element for carrying the left hand gatherer unit 10 is designated generally by the numeral 70 and includes inner and outer frame bars or arms 71 and 72, respectively. These frame bars extend forwardly just inside of the left hand wheel 26, the axle for which is designated by the numeral 73. A similar frame component or element 74 is provided for the right hand gatherer unit 11 and comprises inner and outer frame bars or arms 75 and 76, respectively. The frame bars 71 and 72 and 75 and 76 are rigidly secured at their rear ends to the transverse axle or support 25. The inner bars 71 and 75 are rigidly cross connected or braced by a transverse tie structure in the form of a tie bar 77. The structure is additionally braced by crossed diagonal braces 78. The right hand frame element or component 74 is located inwardly or to the left of the right hand wheel 27, the axle for which is indicated by the numeral 79.

Figure 6 also shows the supporting of the transverse tube 55 on the axle 25. The figure additionally shows a pair of rearwardly extending supports 80 and 81 provided for the purpose of supporting the wagon elevator 44 and hopper 43. The detailed structural and functional relationship between these parts is set forth in the co-pending application referred to above and forms no part of the present invention.

Figures 1 and 7 show that the gatherer units 10 and 11 are transversely spaced apart on opposite sides of a longitudinal median plane that substantially bisects the transverse axle 25. The spacing of the units 10 and 11 provides a space therebetween for the accommodation of the husking mechanism comprising the units 36 and 37, together with the central interior housing structure 38. The relationship between the housing 35 and this space is such as to provide a compartment within which the units 36 and 37 are enclosed. This relationship will be apparent from Figures 1, 2 and 7. The forwardly extending housing 14 that lies between the transverse wall or housing 15 and the rearward end of the housing portion providing the central divider 13 terminates in a transverse wall 85 (Figures 2 and 7, in particular) which forms generally the forward or closed end of the compartment in which the husking units 36 and 37 are housed. For the purposes of clarification the compartment just referred to is indicated in Figures 2 and 7 in general by the numeral 86 and is further identified in part by the same numeral in Figure 1. The rearward end of the compartment 86 opens to the hopper 43, the rearward end of this opening being delineated by the rearward edges of a plurality of associated housing sections including a central section 87, a downwardly and laterally inclining left hand section 88 and a downwardly and laterally inclined right hand section 89. These sections are all part of the general housing structure 35 and extend forwardly to junctures with the rear wall 15 of the forward housing or shield structure. The lowermost portion of the wall 15 has been omitted from the illustration in Figure 7 but its position therein will be clearly apparent if it is assumed that the driving mechanisms 62 and 67 are enclosed thereby, which is the actual structural relationship in Figure 1, the enclosing portions of the wall 15 being indicated by the numerals 90 and 91 at the left hand and right hand side, respectively. These portions do not, of course, extend laterally through the central space providing the compartment 86, this portion of the compartment being enclosed, as aforesaid, by the forward interior wall 85 (Figures 1, 2 and 7).

As previously stated the husking mechanism includes the left and right hand units 36 and 37. A side elevational view of the unit 36 appears in Figure 2. Plan and side elevational views of the unit 37 appear in Figures 3 and 4. Although the parts of the units are similar, they are installed in reverse order in the unit assembly in most instances. Therefore, the general description will be of the right hand unit and reference characters employed on the parts thereof will be employed where deemed necessary in the left hand unit by the addition to such reference characters of the exponent $a$.

The unit 37 includes a longitudinally extending frame structure 95, the longitudinal dimension of which is substantially greater than its lateral dimension. The unit includes a pair of longitudinally extending husking rolls 96 alongside of which is disposed an endless chain 97 constituting ear forwarding means. The chain is trained about upper and lower sprocket 98 and 99 and the upper sprocket is driven by suitable means contained in a housing 100 and including a transverse shaft having a sprocket 101 keyed thereto. The sprocket is suitably driven by a chain 102 (Figure 1) driven by a sprocket 103 (Figure 7) on the transverse power shaft 57. A similar sprocket 103$a$ is provided for driving the parts of the left hand unit 36. Parts corresponding to the husking rolls 96 and ear conveying chain 97 are shown at 96$a$ and 97$a$ in Figure 2 for the left hand unit. The gear housing for driving the parts of the left hand unit is indicated at 100$a$ in Figure 2. As previously stated the right hand unit 37 includes the rearwardly and upwardly extending auger conveyor 42. As best shown in Figure 4, this conveyor is enclosed about its lower portion by a rearwardly and upwardly extending screen housing 104. A similar housing 104$a$ is shown for the left hand unit 36 in Figure 2.

From the description thus far it will be seen that each husking unit 36 (37) includes all the essential parts of the ordinary husking mechanism and that these parts are all self-contained in a unitary structure. According to the present invention each unitary structure 36 (37) may be individually removed from the remainder of the harvester structure without involving a great amount of disassembly of component parts. As a matter of fact, the supporting connections for the units 36 and 37 are so arranged as to permit separation of either unit from the picker structure by means of making a relatively few minor disconnections and without disturbing the remainder of the picker. For the purpose of supporting the right hand unit 37 in the picker organization, the forward end of the frame 95 thereof is provided with a connecting element in the form of a slot means or fork 105 which is slidably received by the right hand portion of the transverse tie bar 77 (Figures 2, 6 and 7). A similar fork 105$a$ is provided for the left hand unit.

As best shown in Figures 6 and 7, the transverse support or axle 25 is provided with a plurality of bracket or supporting means for supporting the husking units 36 and 37. One of these supports comprises a central support 110 which inclines upwardly and slightly rearwardly from the transverse support 25, being rigidly connected at its lower end to the support. Another of the supporting means or elements comprises a left hand support 111 rigidly secured at its lower end to the transverse axle or support 25 and inclining upwardly and rearwardly therefrom. A similar right hand support 112 is provided at the right hand side of the machine, the supports 111 and 112 being substantially in longitudinal alignment with the gatherer units 10 and 11, respectively. The center support 110 is a common support for both units 36 and 37 when installed in place and for this purpose the right hand unit 37 includes at its inner or left hand side a bracket or inner part 113 (Figure 3) by means of which connection may be made to the common or central support 110. The left hand unit 36 has a similar bracket 113$a$, and each of these brackets is slotted, at 114 (Figure 2), for the purpose of receiving a bolt 115 that passes through the apertured upper end of the common or central support 110 (Figure 2).

The upper portion of the right hand outer support 112 is flat and is apertured at 116 (Figure 7) for the purpose of receiving bolts (not shown) that pass through openings 117 (Figure 3) in an outer part or bracket 118 on the right hand unit 37. The left hand support is similarly provided with apertures 116$a$ for accomplishing the same purpose with respect to an outside bracket (not shown) on the left hand unit 36.

It will be seen from the description thus far that each husking unit is carried on what may be termed a three point suspension, comprising the central support 110, an outer support 111 (112), and the supporting relationship with the transverse tie rod 77. An examination of Figure 7 will make clear the fact that either or both of these units may be removed from the remaining parts of the machine without disturbing any of said parts. Figure 2 shows that the upward and rearward inclination of the unit 36 or 37 is above the hopper 43, so that the units may be installed by inserting the same longitudinally, forwardly and downwardly through the opening defined by the rearward edges of the shield sections 87, 88 and 89, securing of the units in place being accomplished by engagement between the transverse tie bar 77 and the forks 105 and 105a on the front end of the right hand and left hand units, respectively; and the rear ends of the units being carried on the supports 110, 111 and 112 as aforesaid. The units may be removed from the compartment 86 by effecting disconnection at the points 110, 111 and 112 and withdrawing the units upwardly and rearwardly.

The following description will pertain to the improved means comprising the swingable or hinged panels for enabling the operator to gain access to the interior of the forward portion of the compartment. As previously described the housing portion or shield 14 extends between the wall 85 at the rearward portion of the housing 12 and the forward portion of the transverse wall 15. A clear picture of the appearance of the shield or housing section 14 may be gained from Figures 1, 2 and 7 wherein it is shown that this shield includes an upper, narrow, longitudinally extending portion 120, a left hand wing 121 and a right hand wing 122. The left hand wing terminates in a lower edge 123 and the right hand wing terminates in a similar edge 124, these edges being spaced vertically above the lower portions of the ear forwarding chains 97 and 97a of the right hand and left hand husking units 37 and 36, respectively. As best shown in Figure 2, the lower terminal edges 123 and 124 are substantially in the plane that includes the interior forwardly and downwardly extending shield or housing portion 30 which lies between the units 36 and 37 within the compartment 86. The shield 38 includes a central portion 125, a left hand wing portion 126 and a right hand wing portion 127, the wing portions diverging downwardly at opposite sides of the central portion 125 and in proximity to the ear forwarding chains 97 and 97a of the husking units. The forward portion of the shield 38 terminates rearwardly a substantial distance behind the transverse wall 85 (Figure 2). This space is normally closed by an auxiliary shield structure, designated generally by the numeral 130. The relationship between the forward portion of the shield 38 and the wall 85 is such as to provide a housing having its opposite sides open in transverse alignment, the structure 130 forming means closing these openings and operative to expose the openings to provide access to the interior of the housing structure. The oppositely disposed openings are provided by a pair of longitudinally forwardly extending portions 131 and 132 on the wings 126 and 127, respectively, of the shield portion 38 (Figure 2 and 5). The three sides of each opening are defined by the extension 131 (132), the forward ends of the wing 126 (127) and the adjacent rear face of the wall 85. The fourth side of the opening is a common side defined by an upper portion of the structure 130, specifically a portion comprising the associated upper end of a left hand panel 133 and a right hand panel 134, which upper portions are interfitted to provide a hinge including a longitudinally extending hinge pin 135. The forward portion of the hinge 135 is carried in an opening 136 (Figure 7) provided in the wall 85; and the rear end of the pin is carried in a bearing or clip 137 mounted on a forward portion of the central section 125 of the shield or housing section 38. The panels 133 and 134, in their closed positions, lie respectively in the planes of the wing sections 126 and 127 of the shield or housing section 38. The lower portions of the panels are flanged, at 138 and 139, respectively, and abut upper flanged portions 140 and 141, respectively, on the forward extensions 131 and 132 of the wing portions or sections 126 and 127. Yielding means in the form of a single coiled tension spring 142 is cross connected between the panels 133 and 134 to hold the panels in closed position (Figure 5). Each of the extensions 131 and 132 is provided with an upstanding abutment or stop means, indicated at 143 for the left hand panel 133 in Figure 2, it being understood that a similar stop means is provided on the extension 132 for the panel 134. The stops or abutments 143 provide means for preventing inward movement of the panels 133 and 134 beyond the full-line positions indicated in Figure 5. The arrangement just described is such that either panel may be opened against the tension of the spring 142 while the other panel remains closed. The position of the fully opened panel 133 is shown in dotted lines in Figure 5. Inasmuch as the action of the spring 142 exerts a force along a line which passes closely adjacent the axis of the hinge 135, it does not have sufficient moment arm to overcome the weight of the panel 133 in its open position, and therefore the panel remains in this position until it is swung partially closed, after which the spring 142 can return it into normal closed position and retain it in that position. Similarly, the other panel can be swung upwardly over the hinge 135 and it will remain in open position until it is intentionally closed by the operator.

As previously referred to, I have provided the rearwardly extending support 81 in the form of an arm for supporting the hopper 43 at the rear or discharge end of the auger conveyors 41 and 42. The rearward portion of each of the screen housings 104 for the husking units 36 and 37 is provided with a plurality of slots 145 through which dirt and chaff and other finely reduced material can pass as the auger conveyors carry ears rearwardly to the hopper. Similar slots are provided in the housing 104a for the left hand unit 36, these slots not appearing in Figure 2 inasmuch as they extend mainly about the outer side of the housing 104a. A blower fan 146 is mounted just rearwardly of the transverse axle or support 25 and below the husking units 36 and 37. This fan has a rearwardly and upwardly directed discharge duct 147 directed in such manner as to create a blast of air for blowing the chaff and other material rearwardly over the rear edge of the hopper 43 so that it does not fall down into the bottom of the hopper along with the ears of corn and thus will not be conveyed with the corn up the wagon elevator 44.

The use of the picker mechanism in general will occur readily to those skilled in the art. The assembling and disassembling operations in connection with the installing and removal of the husking units have been previously set forth, along with emphasis on the desirable features of the construction provided for the accomplishment of the objects hereinbefore set forth. Other objects and features of the invention will undoubtedly occur to those skilled in the art, it being understood that the detailed structure set forth herein is merely representative of a preferred embodiment of the invention and is not exclusive of the various modifications and alterations that will obviously suggest themselves.

What I claim is:

1. In a machine of the class described: a frame adapted to be carried for travel forwardly over a field; crop-gathering means carried by the frame and including a crop-discharge portion; enclosure structure on the frame comprising top, side and front walls defining a compartment extending rearwardly and transversely as respects the crop-gathering means, the top and side walls enclosing the crop-discharge portion of the crop-gathering means and the front wall having an opening therein through which crops may be discharged by the crop-gathering means, said top and side walls terminating at their rear ends to define a rear opening through which access may be had to the compartment from the rear; crop-treating means in the form of a complete, self-contained unit positioned in the compartment, and substantially enclosed by said walls, and having a forward end proximate to the crop-discharge means and a rear end proximate to said rear opening; said rear opening and the top and side walls and said unit being so shaped and proportioned that the unit may be inserted forwardly into, or withdrawn rearwardly from, the compartment; and a pair of means respectively at the forward and rear ends of the unit for detachably supporting the unit on the frame independently of the crop-gathering means and independently of the compartment walls.

2. In a machine of the class described: a frame adapted to be carried for travel forwardly over a field; a pair of crop-gathering means carried on the frame and spaced apart transversely as respects the line of travel of the frame, each means including a crop-discharge portion for directing crops transversely inwardly toward a median plane between said means; enclosure structure on the frame comprising front, top and side walls defining a compartment extending rearwardly as respects the crop-gathering means and located generally medially as respects the crop-discharge portions, forward parts of said walls enclosing said discharge portions and having openings through which said portions may discharge crops within the compartment, said top and side walls terminating at their rear ends to define a rear opening through which access may be had to the compartment from the rear; a pair of crop-treating means, each in the form of a complete, self-contained unit, arranged in longitudinal side-by-side relationship in and medially of the compartment and respectively having forward ends proximate, and in crop-receiving relationship, to the crop-discharge portions of the crop-gathering means, and further respectively having rear ends proximate to the rear opening; said rear opening and the top and side walls and said units being so shaped and proportioned that the units may be inserted forwardly into, or withdrawn rearwardly from, the compartment; and means respectively at the forward and rear ends of the units for detachably supporting the units on the frame independently of the crop-gathering means and independently of the compartment walls.

3. In a machine of the class described: a frame adapted to be carried for travel forwardly over a field; a pair of crop-gathering means carried on the frame and spaced apart transversely as respects the line of travel of the frame, each means including a crop-discharge portion for directing crops transversely inwardly toward a median plane between said means; enclosure structure on the frame comprising front, top and side walls defining a compartment extending rearwardly as respects the crop-gathering means and located generally medially as respects the crop-discharge portions, forward parts of said walls enclosing said discharge portions and having openings through which said portions may discharge crops within the compartment, said top and side walls terminating at their rear ends to define a rear opening through which access may be had to the compartment from the rear; a pair of crop-treating means, each in the form of a complete, self-contained unit, arranged in longitudinal side-by-side relationship in and medially of the compartment and respectively having forward ends proximate, and in crop-receiving relationship, to the crop-discharge portions of the crop-gathering means, and further respectively having rear ends proximate to the rear opening; said rear opening and the top and side walls and said units being so shaped and proportioned that the units may be inserted forwardly into, or withdrawn rearwardly from, the compartment; and means respectively at the forward and rear ends of the units for detachably supporting the units on the frame independently of the crop-gathering means and independently of the compartment walls, said detachable means at the forward end of the unit including cooperative elements respectively on the frame and the unit and arranged so that one hooks over, or unhooks from, the other, and said rear detachable means includes cooperative parts respectively on the frame and the unit and positively engageable to rigidly secure the unit in place and to normally prevent unhooking of the forward detachable means.

4. In a machine of the class described: a frame adapted to be carried for travel forwardly over a field, and including a support arranged transversely as respects the line of travel, and further including a pair of forwardly extending arms transversely spaced on and fixed to the support; tie structure extending transversely between and interconnecting forward portions of the arms so that said tie structure is spaced longitudinally ahead of the transverse support; a crop-treating unit extending longitudinally of the frame and having forward and rear ends respectively proximate to the tie structure and the support; and front and rear connecting means respectively at the front and rear ends of the unit for supporting the unit on the frame, said front means having slot means receiving a portion of the tie structure, and said rear means including connectible and disconnectible cooperative parts respectively on the unit and the support for normally securing the unit against displacement relative to the frame and against displacement of the slot means relative to the tie structure.

5. In a machine of the class described: a frame adapted to be carried for travel forwardly over a field, and including a support arranged transversely as respects the line of travel, and further including a pair of forwardly extending arms transversely spaced on and fixed to the support; tie structure extending transversely between and interconnecting forward portions of the arms so that said tie structure is spaced longitudinally ahead of the transverse support; a crop-treating unit extending longitudinally of the frame and having forward and rear ends respectively proximate to the tie structure and the support; and front and rear connecting means respectively at the front and rear ends of the unit for supporting the unit on the frame, said front means including a pair of cooperative elements respectively on the tie structure and on the unit, one element being in the form of slot means and the other being receivable therein to support the unit against displacement in one longitudinal direction relative to the frame, and the rear means including cooperative connectible and disconnectible parts respectively on the support and on the unit for normally securing the unit against displacement relative to the frame in the opposite longitudinal direction.

6. In a machine of the class described: a frame adapted to be carried for travel forwardly over a field, and including a support arranged transversely as respects the line of travel, and further including a pair of forwardly extending arms transversely spaced on and fixed to the support; tie structure extending transversely between and interconnecting forward portions of the arms so that said tie structure is spaced longitudinally ahead of the transverse support; a pair of outer bracket means spaced transversely apart and carried by the support and respectively generally in longitudinal alinement with the arms; a central bracket means on the support located generally in the longitudinal median plane between the arms; a pair of crop-treating units disposed in longitudinal side-by-side relationship, each having a forward end proximate to the tie structure and a rear end proximate to the bracket means, each rear end having an inner part and an outer part; means detachably securing the forward ends of the units to the tie structure; means detachably securing the rear outer parts of the units respectively to the outer bracket means; and means detachably securing the rear inner parts of the units to the central bracket means.

7. In a machine of the class described: a frame adapted to be carried for travel forwardly over a field, and including a support arranged transversely as respects the line of travel, and further including a pair of forwardly extending arms transversely spaced on and fixed to the support; a pair of outer bracket means spaced transversely apart and carried by the support; a central bracket means on the support located generally in the longitudinal median plane between the arms; a pair of crop-treating units disposed in longitudinal side-by-side relationship, each having a forward end proximate to the respective arm and a rear end proximate to the bracket means, each rear end having an inner part and an outer part; means detachably securing the forward ends of the units respectively to the arms; means detachably securing the rear outer parts of the units respectively to the outer bracket means; and means detachably securing the rear inner parts of the units to the central bracket means.

NORMAN F. ANDREWS.

REFERENCES CITED

The following references are of record in the file of this patent:

UNITED STATES PATENTS

| Number | Name | Date |
|---|---|---|
| 888,411 | Suhr | May 19, 1908 |
| 1,090,150 | Hibbs | Mar. 17, 1914 |
| 1,121,740 | Markham | Dec. 22, 1914 |
| 1,568,683 | Meyers | Jan. 5, 1926 |
| 1,940,851 | Everett et al. | Dec. 26, 1933 |
| 1,984,895 | Rosenthal et al. | Dec. 18, 1934 |
| 2,026,128 | Hayden | Dec. 31, 1935 |
| 2,043,490 | Redrup | June 9, 1936 |
| 2,323,087 | Everett | June 29, 1943 |
| 2,337,592 | Coultas et al. | Dec. 28, 1943 |
| 2,351,515 | Hyman et al. | June 13, 1944 |
| 2,431,016 | Andrews | Nov. 18, 1947 |